United States Patent
Kushida et al.

(10) Patent No.: US 6,856,896 B2
(45) Date of Patent: Feb. 15, 2005

(54) VEHICLE RECOGNITION SUPPORT SYSTEM

(75) Inventors: Kazumitsu Kushida, Saitama (JP); Masashi Satomura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/279,836

(22) Filed: Oct. 25, 2002

(65) Prior Publication Data

US 2003/0225511 A1 Dec. 4, 2003

(30) Foreign Application Priority Data

Oct. 31, 2001 (JP) ........................................ 2001-334855

(51) Int. Cl.[7] ............................ G08G 1/09; G01C 21/00
(52) U.S. Cl. ....................................... 701/207; 701/300
(58) Field of Search ................................ 701/207, 208, 701/215, 211, 300; 340/995.12, 995.25; 342/357.09, 357.1, 357.03, 357.13, 357.08

(56) References Cited

U.S. PATENT DOCUMENTS

| | | | | |
|---|---|---|---|---|
| 5,926,113 A | * | 7/1999 | Jones et al. | 340/906 |
| 6,326,903 B1 | * | 12/2001 | Gross et al. | 340/988 |
| 6,396,417 B2 | * | 5/2002 | Lee | 340/904 |
| 6,405,132 B1 | * | 6/2002 | Breed et al. | 701/301 |
| 6,615,137 B2 | * | 9/2003 | Lutter et al. | 701/301 |
| 6,658,355 B2 | * | 12/2003 | Miller et al. | 701/301 |
| 6,662,108 B2 | * | 12/2003 | Miller et al. | 701/301 |
| 2002/0198653 A1 | * | 12/2002 | Lutter | 701/209 |

FOREIGN PATENT DOCUMENTS

JP 11-353592 12/1999

* cited by examiner

Primary Examiner—Michael J. Zanelli
(74) Attorney, Agent, or Firm—Birch, Stewart, Kolasch & Birch, LLP

(57) ABSTRACT

A vehicle recognition system to enable a two-wheeled vehicle without a navigation system to recognize the position of a traffic intersection and to cause itself to be noticed by other vehicles. The system includes a communication distance measurement modem which receives positional information of a traffic intersection and the current position of a four wheeled vehicle from the four-wheeled vehicle. The vehicle information interface (I/F) collects vehicle velocities, acceleration and deceleration, and mileages and provides them to an electronic control unit (ECU). A differential global positioning system (DGPS) measures the current position based on an electric wave received by a GPS antenna and correction information received by a FM antenna. The ECU determines the presence of another vehicle that the two-wheeled vehicle may intersect, and outputs visual and audio signals to the helmet worn by the driver of the two-wheel vehicle.

14 Claims, 11 Drawing Sheets

VEHICLE RECOGNITION SUPPORT SYSTEM

CROSS-REFERENCE TO RELATED APPLICATION

The present application claims priority under 35 U.S.C. §119 to Japanese Patent Application No. 2001-334855, filed on Oct. 31, 2001, the entire contents of which are hereby incorporated by reference.

BACKGROUND OF THE INVENTION

1. Field of the Invention

The present invention relates to a vehicle recognition support system to be used by vehicles for recognizing the position of the other vehicle by wireless communication, and informing the driver. More specifically, the invention relates to a vehicle recognition support system in which a vehicle that is not provided with a navigation function establishes a communication link with a neighboring vehicle provided with a navigation function to obtain navigation information, so that each vehicle can recognize its relative position with respect to the other vehicle.

2. Description of Background Art

In order to reduce traffic accident and its damages, improvements have been made to both two- and four-wheeled vehicles. These include improving the eye-catching property of two-wheeled vehicles by illumination of heads light in the daytime, and providing ABS and airbags for four-wheeled vehicles. However, in the case of two-wheeled vehicles, further reduction of accidents through preventive safety measures is important. According to the past accident data, it is said that the main contributing factors to accidents are a wrong determination due to false recognition of the distance from or the speed of the second party (two-wheeled vehicle), not looking ahead carefully, or late recognition by lack of confirmation of safe conditions by drivers of nearby four-wheeled vehicles. "Wrong determination" is generally caused by the fact that the two-wheeled vehicle is apt to be perceived to be at a position farther away from and to be moving slower than it actually is. This is because the front projected area of a two-wheeled vehicle is smaller than that of the four-wheeled vehicle.

One of the contributing factors of "late recognition" is the fact that the two-wheel vehicle tends to be assimilated into the background when a large vehicle such as a track or a bus is traveling behind the two-wheeled vehicle, and that the visual range of the driver on the right turning vehicle is impaired by the on-coming right turning vehicle or other vehicles, which generates a dead angle.

Since the visual perceptive function of human being is such that the wider the width of the vehicle body, the easier recognition of the approaching speed and the relative distance becomes, and since accurately perceiving the speed and distance is easier with familiar objects (four-wheeled vehicles), wrong perception seems to occur more frequently when viewing two-wheeled vehicles. Therefore, for their self-defense, riders of two-wheeled vehicles are required to have positive means for foreseeing and forecasting objects in their surroundings.

In order to address the aforementioned issues, the following alarm system is proposed in JP-A-11-353594.

In this disclosure, when a turning vehicle (four-wheeled vehicle) turning beyond the opposite lane issues a detection signal, and a vehicle in the through traffic lane (two-wheeled vehicle) that is driving straight ahead on the opposite lane returns a reply signal in response to the detection signal, the turning vehicle is able to calculate the relative distance R between itself and the vehicle in the through traffic. When the relative distance R is shorter than the reference distance (Rref), the turning vehicle (four-wheeled vehicle) gives an alarm to the driver of the turning vehicle, and simultaneously, issues a annunciation signal to the vehicle in the opposite through traffic lane. The vehicle in the opposite through traffic lane receives the annunciation signal and gives an alarm to the driver of that vehicle.

In JP-A-11-353592, another alarm system is proposed as follows.

In this case, when the vehicle (four-wheeled vehicle) that is just turning issues a detection signal toward the dead angle of the turning direction, and a replay signal is returned to the detection signal from the other vehicle, the turning vehicle calculates the relative distance R between itself and the other vehicle. When the relative distance R is shorter than the reference distance Rref, the turning vehicle (four-wheeled vehicle) issues an alarm to the driver of the four wheeled-vehicle, and simultaneously, issues an annunciation signal to the aforementioned other vehicle. The other vehicle in the through traffic lane issues an alarm to the driver of that vehicle.

In the related art described above, the two-wheeled vehicles start the "other vehicle recognition process" with reception of detection signal sent from the turning vehicle (four-wheeled vehicle), and thus are unable to detect vehicles other than those that detect them first. When these two-wheeled vehicles turn as well, they have no means to let other vehicles recognize their actions.

Such a technical problem can be solved by mounting a position survey system such as GPS and a navigation system on every vehicle so that the vehicles approaching the traffic intersection communicate with respect to each other to recognize the position of the respective vehicles.

However, since two-wheeled vehicles having only a small storage space, the types of vehicle that can accommodate the navigation system are limited to larger and heavier two-wheeled vehicles. In addition, it is difficult to mount a costly navigation system on a less expensive two-wheel vehicle in comparison with the four-wheeled vehicle.

Accordingly, it is an object of the invention to provide a vehicle recognition support system that can solve the problems in the related art, by enabling the two-wheeled vehicle to recognize the position of the traffic intersection and give notice to other vehicles without the need for mounting a navigation system on the two-wheeled vehicle.

SUMMARY AND OBJECTS OF THE INVENTION

In order to achieve the object described above, the present invention includes the characteristics and features described below.

(1) A vehicle recognition support system is provided so that each vehicle in a plurality of vehicles is able to recognize its own position, and exchange its own positional information by communicating with the other vehicles. The system provides that at least one of the vehicles (main vehicle) includes map information including coordinate information on the traffic intersection and means for providing the aforementioned map information to a vehicle (sub vehicle) which is not provided with the map information by said wireless communication.

(2) The aforementioned main vehicle includes means for extracting the positional information of the traffic intersection existing in a prescribed region in the direction of travel from the aforementioned map information, and means for providing the aforementioned positional information of the traffic intersection to the sub vehicle by the wireless communication.

(3) The sub vehicle is equipped with means for obtaining the aforementioned positional information of the traffic intersection, and means for displaying the positions of the aforementioned main vehicle and itself along with the position of the traffic intersection.

(4) A vehicle recognition support system is provided so that at least one (main vehicle) of the vehicles out of a plurality of vehicles capable of wireless communication with each other is provided with position survey means for recognizing the position of itself. Further, the system provides the aforementioned main vehicle with map information including positional information on the traffic intersection, means for extracting positional information of the traffic intersection existing in a prescribed range in the direction of travel from the aforementioned map information, and means for issuing positional information on its own position and the position of the traffic intersection to a vehicle that is not provided with the aforementioned position survey means (sub vehicle) by the wireless communication.

(5) The sub vehicle includes means for obtaining the position of the main vehicle and positional information on the traffic intersection by the wireless communication, distance measurement means for measuring the relative distance to the main vehicle, and means for determining the position itself (sub vehicle) based on the travel distance of itself and time-based variations in relative distance with respect to the main vehicle.

According to the characteristic shown in (1), when at least one vehicle is provided with map information, other sub vehicle can obtain the map information to recognize the position of the traffic intersection or the like, and thus the position of the intersection that the sub vehicle is approaching can be recognized.

According to the characteristic shown in (2), since only the traffic intersections that each vehicle should notice may be selectively extracted, information on the intersections that are not necessary to be noticed is prevented from being issued and thus the communication effectiveness and efficiency is improved.

According to the characteristic shown in (3), the sub vehicle that is not provided with map information can recognize the position of the traffic intersection that it is approaching together with the positions of the main vehicle and itself.

According to the characteristic shown in (4), when at least one vehicle is provided with map information, a sub vehicle that is not provided with the position survey means nor map information is still able to recognize the traffic intersection that it is approaching.

According to the characteristic shown in (5), the sub vehicle that is not provided with the position survey means can recognize the current position of itself.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the drawings, a preferred embodiment of the present invention will be described in detail. The present invention is characterized in that a vehicle that is not provided with a navigation function dynamically establishes the communication link with a neighboring vehicle provided with a navigation function to obtain navigation information, so that each vehicle can recognize the relative positional relation with respect to the other vehicle or the traffic intersection. In this case, an example of a combination of a four-wheeled vehicle A provided with a navigation function and a two-wheeled vehicle B that is not provided with a navigation function is described.

Figure 1:
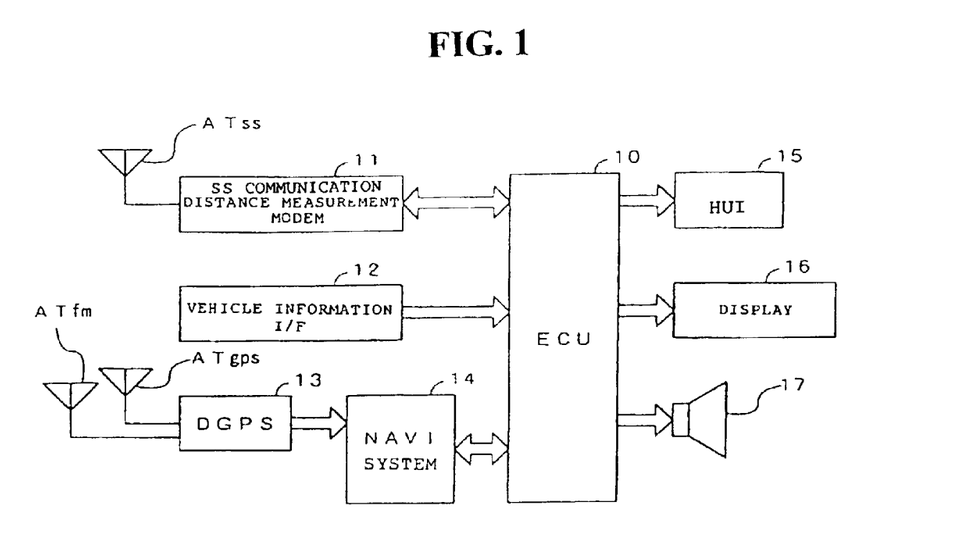
FIG. 1 is a block diagram showing the first embodiment of the vehicle recognition support system to be mounted on the four-wheeled vehicle A.
Figure 2:
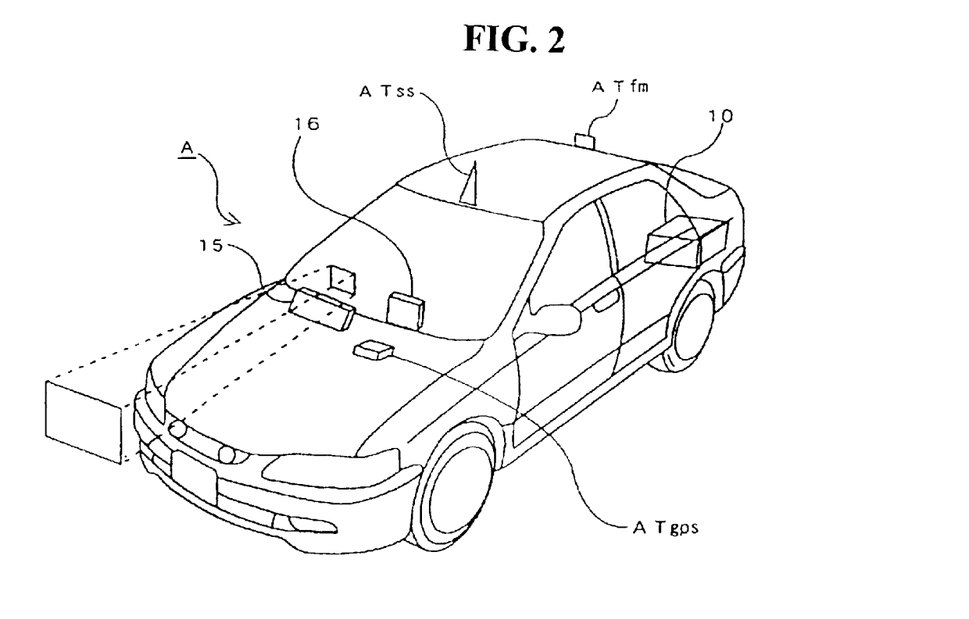
FIG. 2 is a perspective view showing an example in which the vehicle recognition support system (first embodiment) is mounted on the four-wheeled vehicle A.

FIG. 1 is a block diagram of the first embodiment of a vehicle recognition support system to be mounted on a four-wheeled vehicle A, and FIG. 2 is a perspective view showing an example in which the vehicle recognition support system is mounted on the four-wheeled vehicle A.

Communication between vehicles (four-wheeled vehicle/two-wheeled vehicle) requires an autonomous dispersibility to quickly establish a communication link an unspecified party is encountered, a capability to transmit positional information that varies with time on real time basis, and a high reliability to perform stable communication against variations in traffic situation or environmental status. Accordingly, the communication between vehicles in the present embodiment employs a SS (Spread Spectrum) communication system that is a direct spread for the SHF band (for example, 2.4 GHz). The CSMA (Carrier Sense Multiple Access) system, which is one of several time-division multiplexing techniques, is employed as a multiple access system.

On the other hand, in the position survey system utilizing the GPS, it is known that electric wave is blocked off between high buildings or under elevated bridges, and that the accuracy of GPS signals may deteriorate by the influence of multipath or the like. In order to maintain each function under such circumstances, the present embodiment employs the SS communication distance measurement system in which the relative distance is obtained by measuring the reflection time of electric wave during communication, and the result of position survey made by GPS is corrected based on the result of distance measurement. In this arrangement, it is not necessary to provide a new distance measurement apparatus such as radar and redundancy is achieved in combination with a high-precision DGPS.

In FIG. 1, the SS communication distance measurement modem 11 establishes a wireless link with the other vehicle (two-wheeled vehicle B) via a SS communication antenna ATss to perform SS communication, and measures the relative distance with respect to the other party of communication simultaneously with sending/receiving of information. The aforementioned CSMA system is employed as a multiple access system. The vehicle information interface (I/F) 12 collects vehicle information such as velocities, acceleration, decelerations, and mileages, and so on at a prescribed cycle, and informs them to an ECU (Engine Control Unit) 10.

A DGPS (Differential GPS) 13 measures the current position of the own vehicle based on a plurality of GPS electric waves received by the GPS antenna ATgps, and receives correction information transmitted by FM data broadcast from a base station by the FM antenna ATfm to correct the aforementioned result of position measurement.

A navigation (NAVI) system 14 maps the obtained current position on the electronic map. HUI (Heads Up Indicator) 15 displays information on the other vehicle in the peripheral visual field. NAVI display 16 displays NAVI information, various operation panel, vehicle information, and so on. A speaker 17 generates a voice message or an alarm sound.

Figure 3:
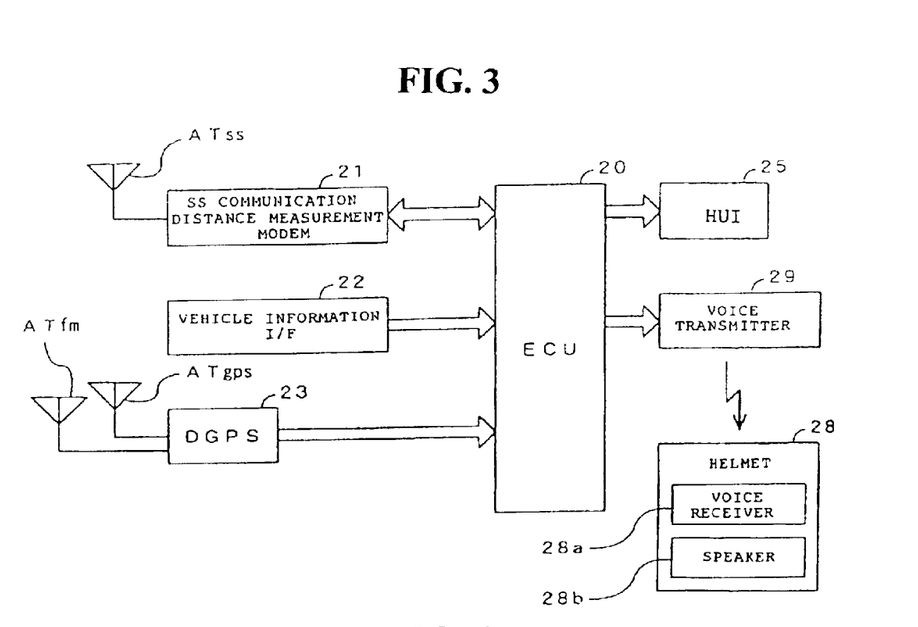
FIG. 3 is a block diagram showing the first embodiment of the vehicle recognition support system to be mounted on the two-wheeled vehicle B.
Figure 4:
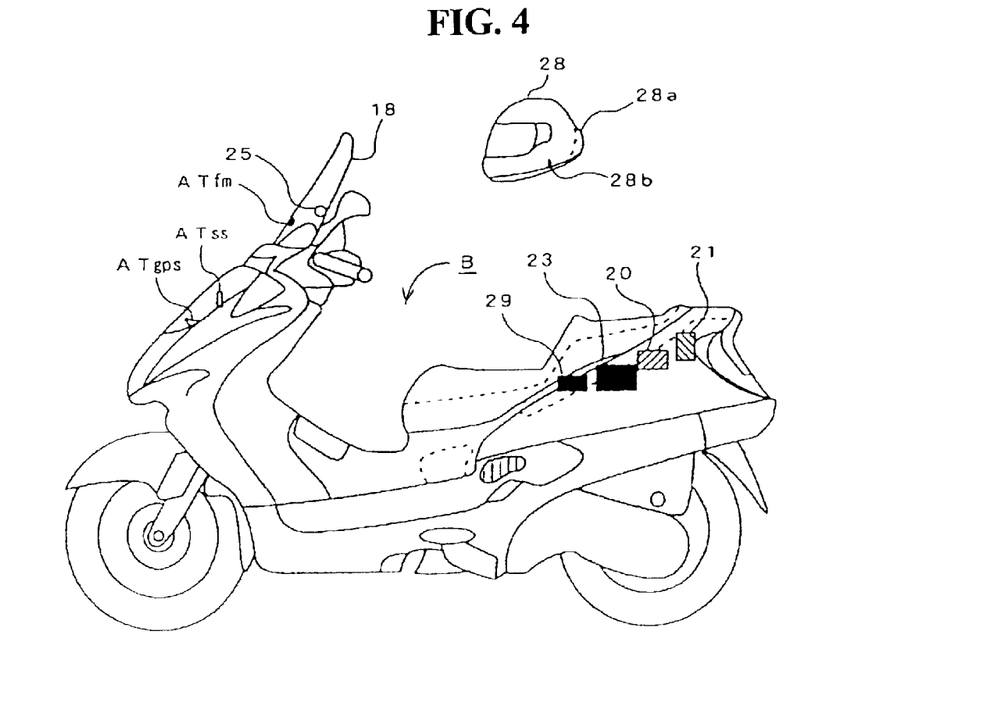
FIG. 4 is a perspective view showing an example in which the vehicle recognition support system (first embodiment) is mounted on the two-wheeled vehicle B.

FIG. 3 is a block diagram of the first embodiment of the vehicle recognition support system to be mounted on the two-wheeled vehicle B, and FIG. 4 is a perspective view showing an example of the vehicle recognition system being mounted on the two-wheeled vehicle A.

The SS communication distance measurement modem 21 establishes the wireless link with the object vehicle (four-wheeled vehicle A) via the SS communication antenna ATss to perform the SS communication, and measures the relative distance from the party to communicate simultaneously with the sending and receiving of information. The vehicle information I/F 22 collects vehicle information including velocities, acceleration, deceleration, and mileages, and so on in a prescribed cycle and provides it to the ECU 20. The DGPS 23 measures the current position based on GPS electric waves received by the GPS antenna ATgps and correction information received by the FM print antenna ATfm attached on the backside of the windshield 18.

The driver of the two-wheeled vehicle determines the direction of travel while maintaining the balance by two inputs of steering and the weight shift differs from that in the four-wheeled vehicle, in that the driver recognizes variations in roll and yawing angle of the two-wheeled vehicle mainly from information through his/her eyes, and performs feedback to the course accordingly. Especially when the driver's attention to the surrounding traffic such as around the traffic intersection is required, guidance for the driver is required in order to deal with the large amount of information about his own and the other vehicle to which he/she may be subjected.

Accordingly, in order to allow easy recognition in the peripheral vision, provision of information to visual perception employs a method of projecting high-intensity LED (yellow) having a laterally elongated light emitting surface onto the central portion of the windshield as HUI 25, and the amount of information is determined to the minimum amount.

Figure 13:
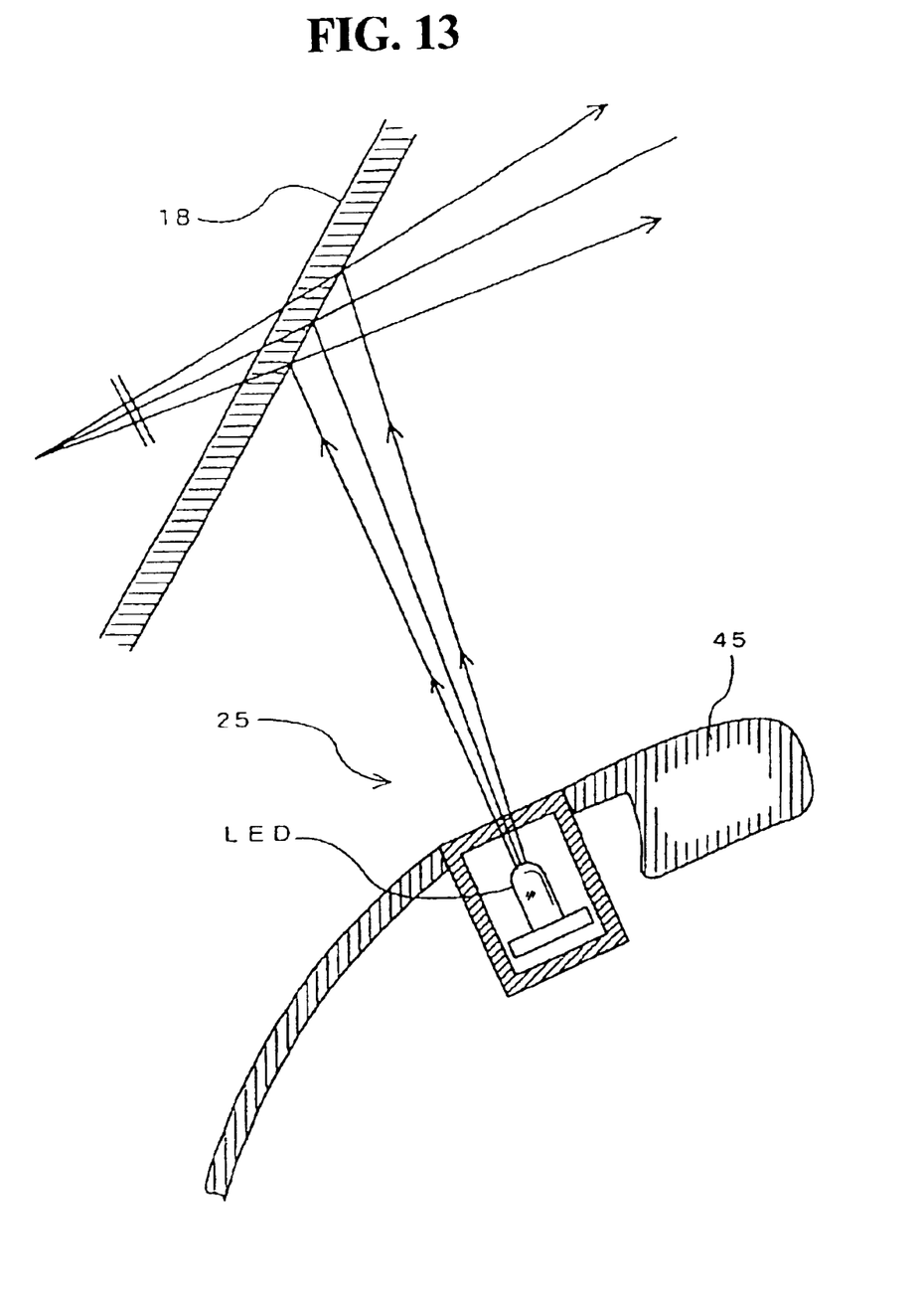
FIG. 13 is a principle view of the HUI.
Figure 14:
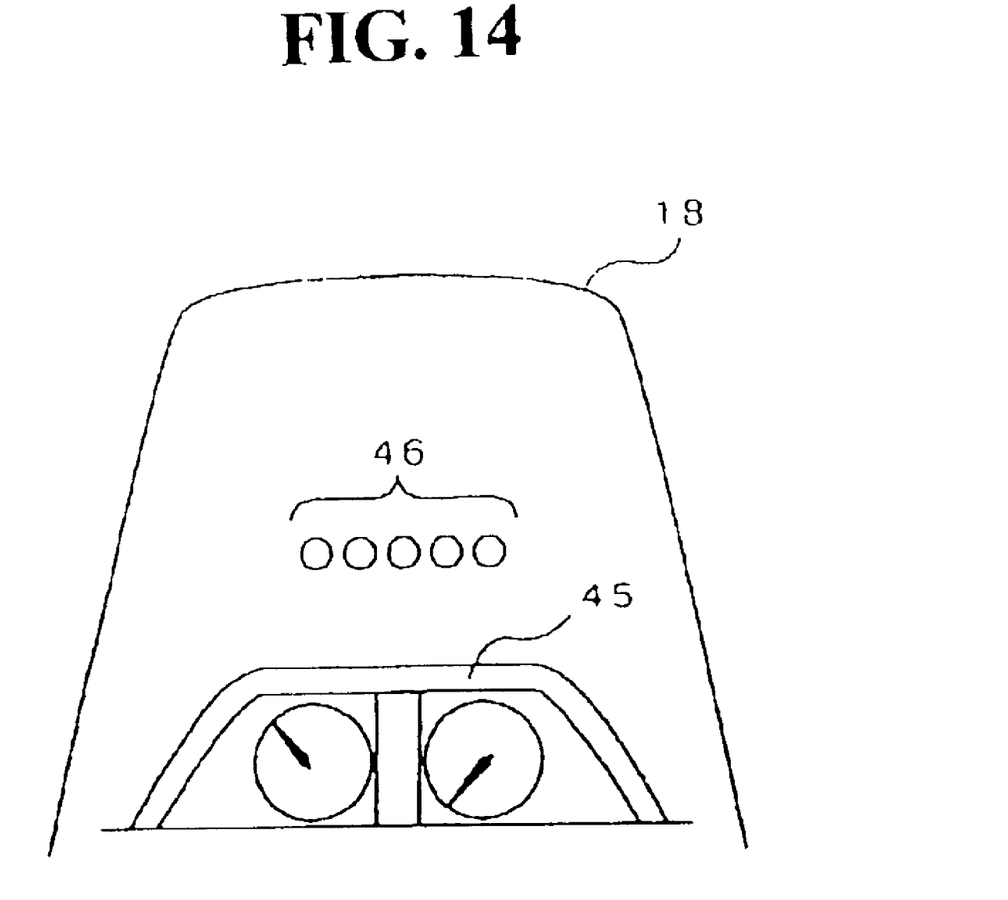
FIG. 14 is a drawing showing an example of display on the HUI in the two-wheeled vehicle B.

FIG. 13 is a principal view of the HUI 25, and a plurality of LEDs are aligned in the lateral direction on a meter cover 45 in the position of facing toward the windshield 18 of the two-wheeled vehicle. FIG. 14 is an image of the screen on the windshield 18 viewed from the driver.

The voice announcement is provided through the voice receiver 28a and the speaker integrated in a helmet 28b provided in the voice transmitter 29 mounted on the vehicle body side and the outside of the helmet 28 respectively. The phrase of the voice announcement is made to be understood and completed quickly, preferably within two seconds.

Figure 5:
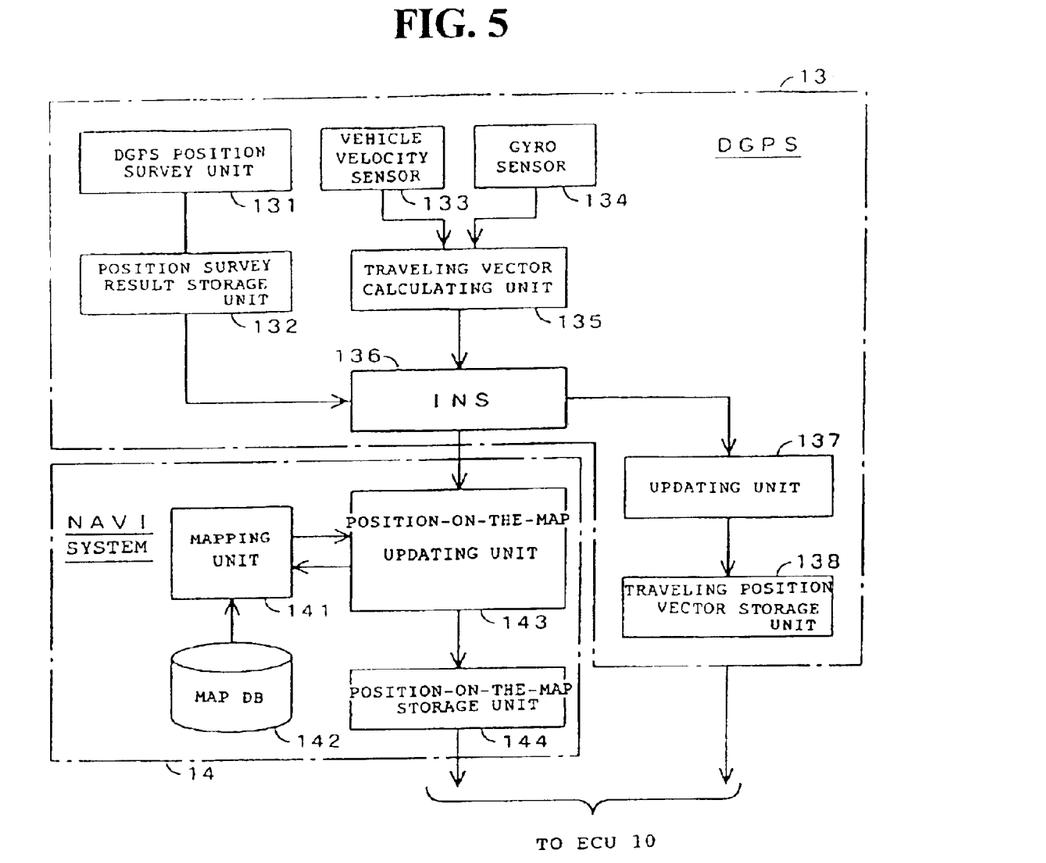
FIG. 5 is a functional block diagram of a DGPS and a NAVI system mounted on the four-wheeled vehicle A.

FIG. 5 is a block diagram showing the construction of the principal portion of the position survey function of DGPS 13 and the NAVI system 14 in the aforementioned four-wheeled vehicle A, and the reference numerals identical to the previous example represent the identical parts.

In the DGPS 13, the DGPS position survey unit 131 measures the current position periodically based on the time of the day at which a plurality of GPS electric waves are received, and corrects the result of position survey based on correction information transmitted from the FM data broadcast. The latest result of position survey is stored in the position survey result storage unit 132.

In the traveling vector calculating unit 135 calculates the traveling vector (vehicle velocity and the direction of travel) of the four-wheeled vehicle based on the vehicle velocity detected by the vehicle velocity sensor 133 and the orientation detected by the gyro sensor 134. An inertial navigation system (INS) 136 calculates the current position of the own vehicle periodically as a traveling vector (hereinafter referred to as traveling position vector) with the current position registered as a starting point based on the result of the aforementioned position survey and the traveling vector. The result of calculation is updated by the updating unit 137 and registered to the traveling position vector storage unit 138.

In the NAVI system 14, the mapping unit 141 maps the current position on the electronic map based on the current position of the four-wheeled vehicle as directed by the position-on-the-map updating unit 143 and electronic map information stored in the map database (DB) 142 in advance, and informs the position-on-the-map updating unit 143. The position-on-the-map updating unit 143 registers the informed position-on-the-map of the four-wheeled vehicle to the position-on-the-map storage unit 144. The aforementioned position-on-the-map and the traveling position vector are provided to the aforementioned ECU10.

Figure 6:
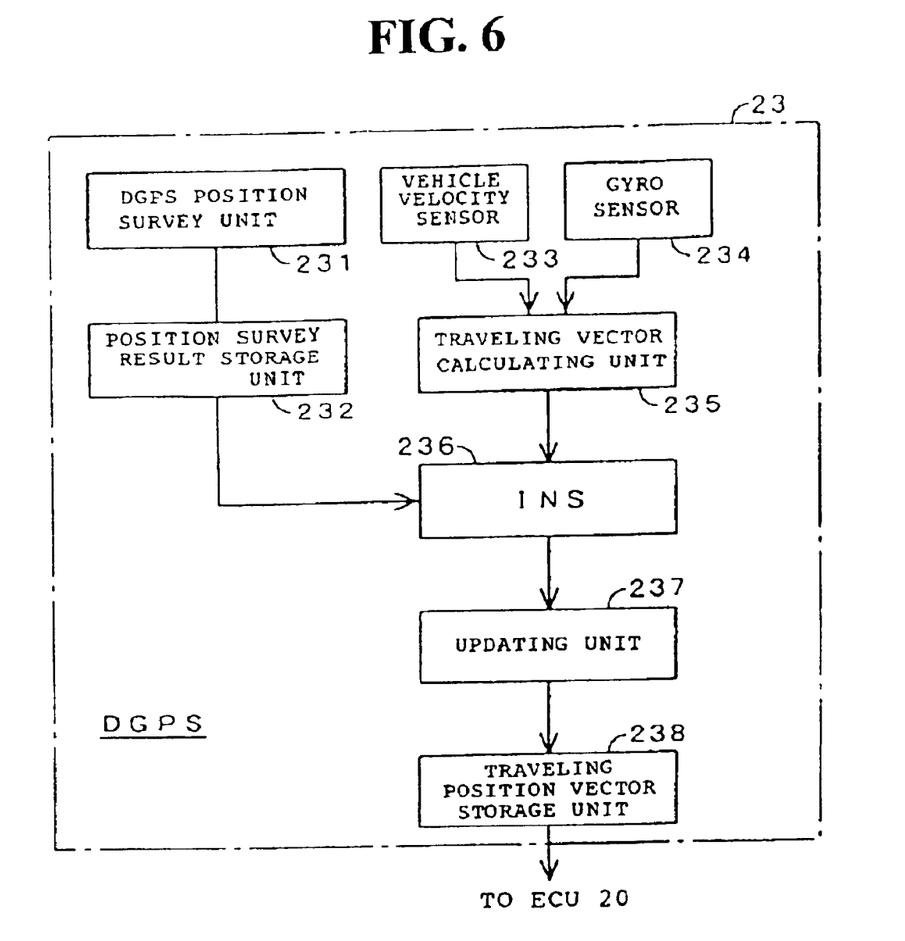
FIG. 6 is a block diagram showing the function of the DGPS mounted on the two-wheeled vehicle B.

FIG. 6 is a block diagram showing the construction of the principal portion of the DGPS 23 to be mounted on the two-wheeled vehicle B, and the reference numerals identical to the previous example represent the identical parts.

The DGPS position survey unit 231 measures the current position periodically based on the time of the day at which a plurality of GPS electronic waves are received, and corrects the result of measurement based on correction information transmitted by the FM data broadcast. The position survey result storage unit 232 is stored with the latest result of position survey.

The traveling vector calculating unit 235 calculates the traveling vector of the own vehicle based on the vehicle velocity detected by the vehicle velocity sensor 233 and the orientation detected by the gyro sensor 234. The INS 236 calculates the traveling position vector of the own vehicle periodically based on the aforementioned result of position survey and the traveling vector. The result of calculation is updated by the updating unit 237 and registered in the traveling position vector storage unit 238.

Figure 7:
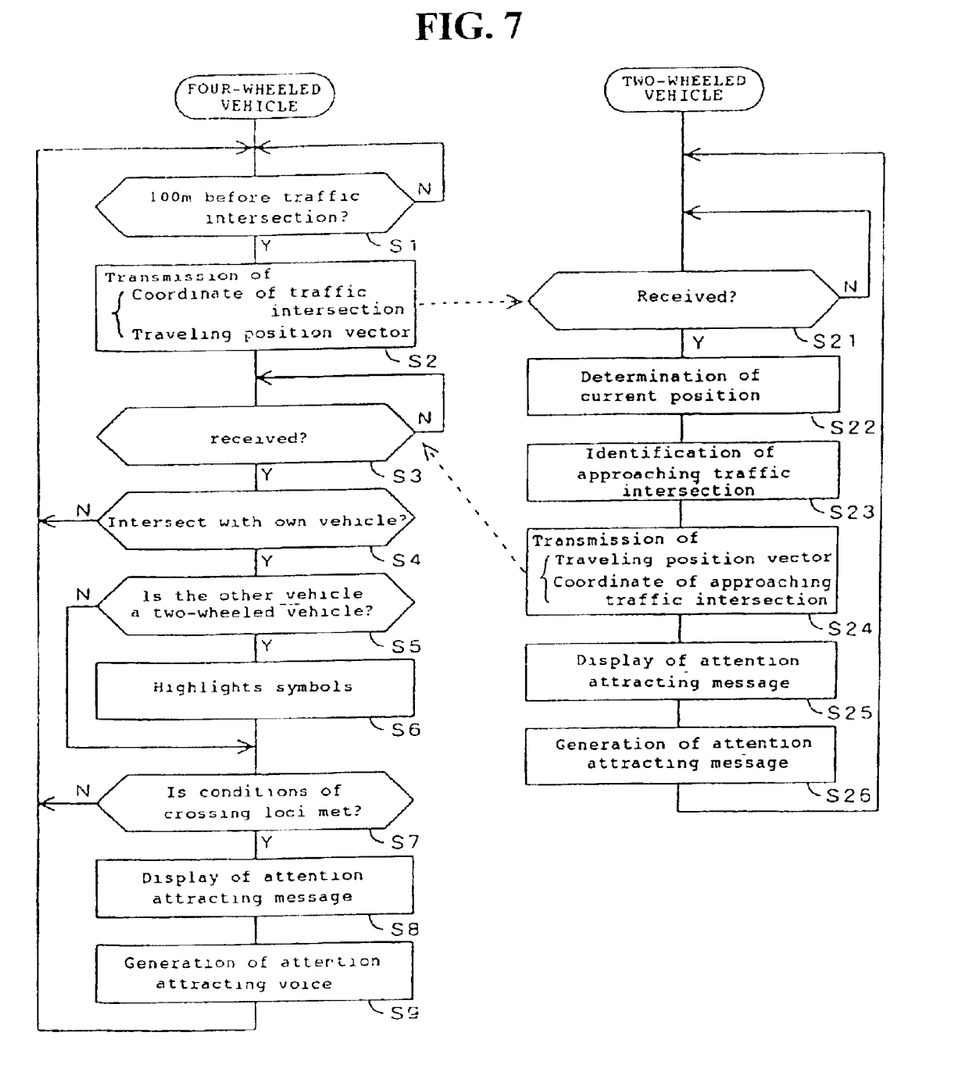
FIG. 7 is a flow chart showing the action of the first embodiment.

Subsequently, the actions of the four-wheeled vehicle A and the two-wheeled vehicle B in the present embodiment is described referring to the flow chart in FIG. 7. This flow chart mainly shows the action of the ECU 10, 20 of the respective vehicles.

When the four-wheeled vehicle A recognized that it has reached a point about 100 meters before the traffic intersection existing in a prescribed range in the direction of travel in the step S1, it transmits the coordinates of all the recognized traffic intersections and its own traveling position vector all the vehicles with which the communication link is established together with its own ID, the estimated position, the period of time required until it reaches the traffic intersection, the number of vehicles received, the state of its the own brake, turn signal, and so on as data of about 40 bytes in the step S2. The aforementioned ID contains peculiar identification information registered together with the vehicle-type information, in order to distinguish itself from two-wheeled vehicles.

When the two-wheeled vehicle B receives the aforementioned data in the step S21, it pinpoints is own current position based on the result of measurement by the DGPS23, the current position of the four-wheeled vehicle A, and the relative distance between itself and the four-wheeled vehicle A measured by the SS communication distance measurement modem 21 and obtains the traveling position vector in the step S22. In the step S23, the two-wheeled vehicle identifies the traffic intersection that it is approaching based on its own traveling position vector and the coordinate of each traffic intersection. In the step S24, the two-wheeled vehicle transmits its own traveling position vector and the coordinate of the aforementioned traffic intersection being approached, together with its own ID, its estimated position, and its vehicle state.

When the four-wheeled vehicle A receives the aforementioned data in the step S3, it extracts all the vehicles that can intersect itself as vehicles to notice based on the traveling position vector of the four-wheeled vehicle registered in the aforementioned traveling position vector storage unit 138 and the traveling position vector informed from each vehicle in the step S4.

Figure 8:
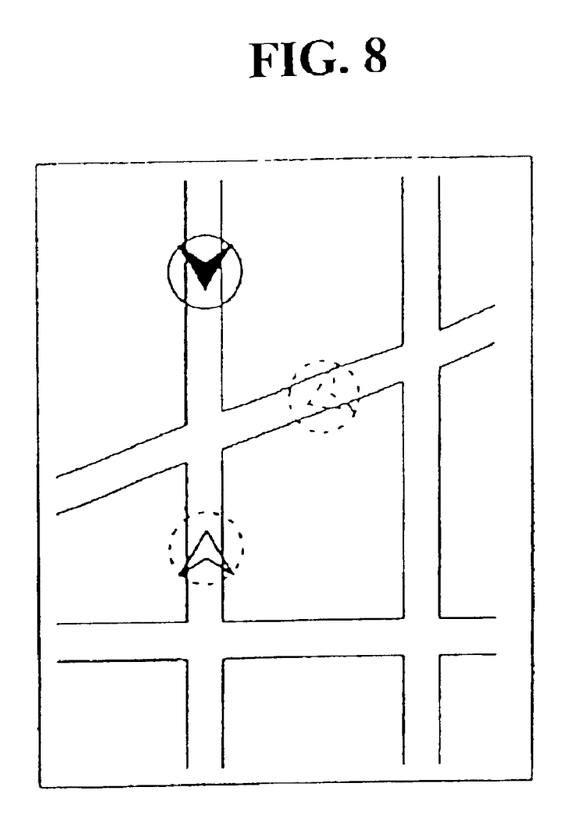
FIG. 8 is a drawing showing an example of display on the NAVI display.

In the step S5, whether or not the vehicle to notice is a two-wheeled vehicle is determined based on the aforementioned ID. In the step S6, when the vehicle to notice is a two-wheeled vehicle, the symbol representing the current position of the vehicle of interest (a solid black arrow in the figure) is highlighted on the NAVI display 16 together with a symbol representing the four-wheeled vehicle itself (a hollow arrow in the figure) and symbols representing other vehicles to notice (a dotted arrow in the figure) as shown in FIG. 8.

In the step S7, whether or not the conditions of crossing loci are met based on the time of the day when the four-wheeled vehicle and each of other vehicles reach the traffic intersection is determined for all of the aforementioned extracted vehicles to notice. For example, assuming that t2 is the time of the day when four-wheeled vehicle A reaches the aforementioned traffic intersection, t3 is the time of the day when the vehicle to notice, namely a two-wheeled vehicle B, reaches the aforementioned traffic intersection, when the equation (1) is true, the conditions of crossing loci are considered to be met.

$$|t2-t3| <= tref \qquad (1)$$

where, tref is a prescribed reference time difference, and it is 4 seconds in this embodiment.

Figure 9:
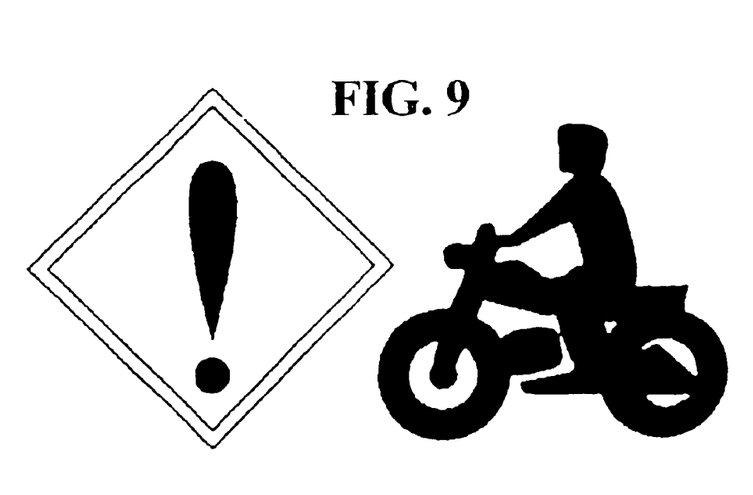
FIG. 9 is a drawing showing an example of display on the HUI in the four-wheeled vehicle A.

When there exists a vehicle in which the conditions of crossing loci are met, in the step S8, the attention attracting symbols are displayed on HUI 15 as shown in FIG. 9, and an alarm sound or voice message is issued from a speaker 17 in the step S9.

In the two-wheeled vehicle B, after its own traveling position vector is issued in the aforementioned step S24, the attention attracting symbols 46 are displayed on the HUI 25 as shown in FIG. 14 in the step S25, and an attention attracting voice message or alarm sound is issued for the helmet 28 of the driver from the voice transmitter 29 in the step S26.

According to the present embodiment, even the vehicle that is not provided with the NAVI system can recognize the position of the traffic intersection and the positions of other vehicles based on information provided from a vehicle that is provided with the NAVI system.

Figure 10:
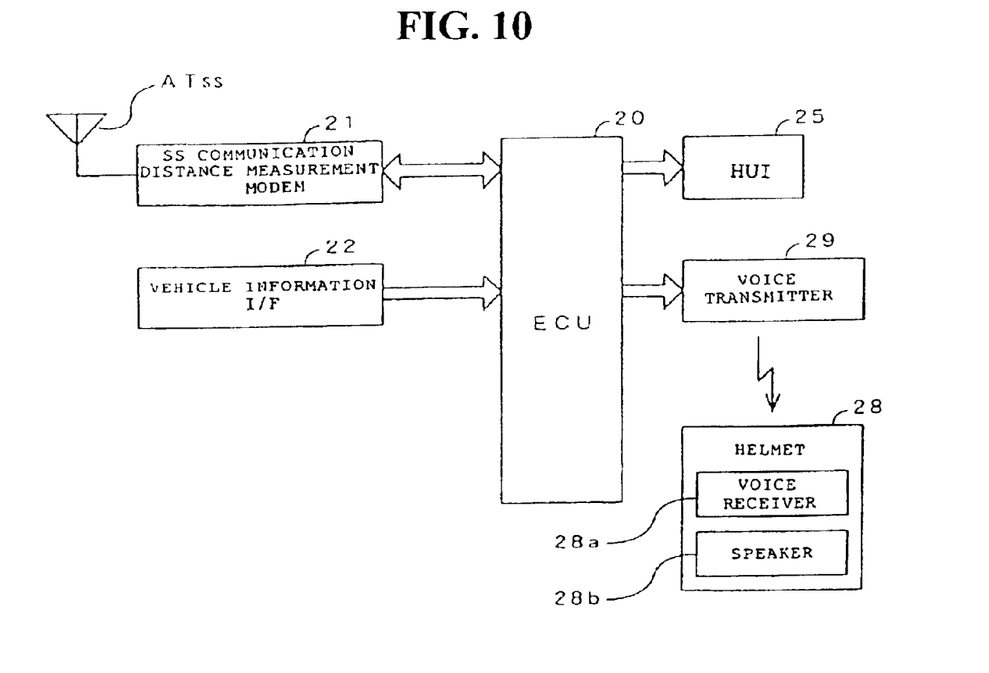
FIG. 10 is a block diagram showing the second embodiment of the vehicle recognition support system to be mounted on the two-wheeled vehicle B.

FIG. 10 is a block diagram showing the second embodiment of the vehicle recognition support system provided on the two-wheeled vehicle B, in which the reference numerals identical to the previous example represent the identical components. Since the present embodiment differs from the first embodiment only in that the two-wheeled vehicle B is not provided with the GPS position survey function and the construction of the four-wheeled vehicle A is identical to the aforementioned first embodiment, it is not described here again.

Figure 11:
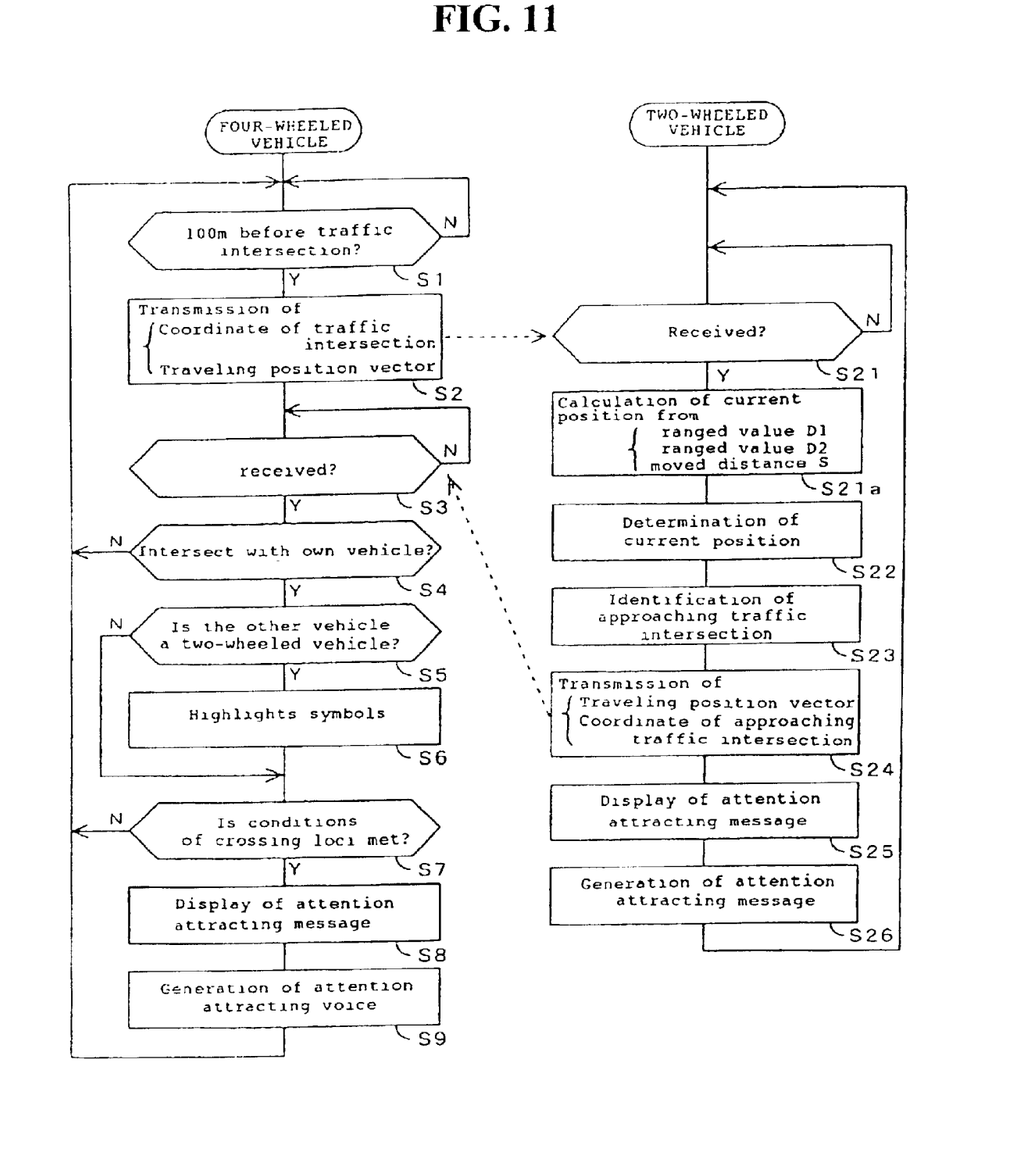
FIG. 11 is a flow chart showing the action of the second embodiment.

Subsequently, the action of the four-wheeled vehicle A and the two-wheeled vehicle B in this embodiment will be described referring to the flow chart in FIG. 11. This flow chart shows mainly the action of the ECUs 10, 20 of the respective vehicles, and the identical or the equivalent process is performed in the step identical to the previous embodiment.

Figure 12:
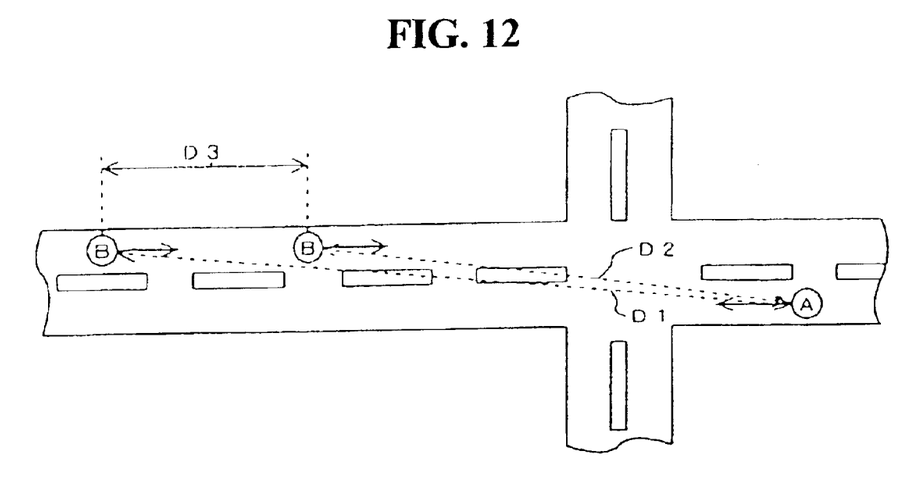
FIG. 12 is a drawing for explaining the distance measurement method by a SS communication.

When the two-wheeled vehicle B receives the coordinate of the traffic intersection and the traveling position vector of the four-wheeled vehicle A in the step S21 in the same manner as described above, the two-wheeled vehicle B calculates its current position based on the relative distance D1 with respect to the four-wheeled vehicle A measured during the previous SS communication, the relative distance D2 with respect to the four-wheeled vehicle A measured during the SS communication of this time, and its moved distance D3 during the period between the previous measuring and the measuring of this time as shown in FIG. 12 in the step S21a.

In the step S22, the two-wheeled vehicle B determines its own current position accurately based on the result of calculation of the current position, the current position of the four-wheeled vehicle obtained from the four-wheeled vehicle A of interest, and the relative distance between itself and the four-wheeled vehicle A measured by the SS communication distance measurement modem 21 to obtain its traveling position vector. In the step S23, the two-wheeled vehicle B specifies the traffic intersection to which the own vehicle is approaching based on the traveling position vector of the own vehicle and the coordinates of each intersections obtained from the four-wheeled vehicle A. In the step S24, the two-wheeled vehicle B transmits its own traveling position vector and the coordinate of the approaching traffic intersection together with its own ID, its estimated position, and its vehicle state.

When the four-wheeled vehicle A receives the above-described data in the step S3, it extracts all the vehicles that may intersect itself based on its own traveling position vector registered in the aforementioned traveling position vector storage unit 138 and the traveling position vector informed from each vehicle as vehicle to notice in the step S4.

In the step S5, whether or not the vehicle to notice is a two-wheeled vehicle is determined based on the aforementioned ID. When the vehicle to notice is a two-wheeled vehicle, the symbol representing the current position of the vehicle of interest is highlighted on the NAVI display 16 as shown in FIG. 8 in the step S6. In the step S7, whether or not the conditions of crossing loci are met based on the period of time required until the four-wheeled vehicle and the respective other vehicle reach the aforementioned traffic intersection is determined for all the aforementioned extracted vehicles to notice.

When the vehicle in which the conditions of crossing loci are met exists, the attention attracting symbols are displayed in HUI 15 in the step S8, and the alarm sound or voice message is issued from the speaker 17 in the step S9.

In the step S25, the two-wheeled vehicle B displays the attention attracting symbols on the HUI 25 after its own traveling position vector is transmitted in the aforementioned step S24, and the attention attracting voice message, the alarm sound or the like is output from the voice transmitter 29 to the helmet 28 of the driver in the step S26.

According to the present embodiment, even the vehicles that are not provided with a NAVI system and a position survey function can recognize the position of the traffic intersection, their own positions, and the positions of other vehicles based on information given by the vehicle that is provided with the NAVI system.

According to the present invention, the following effects are achieved.

(1) According to a first of the present invention, when at least one vehicle, namely the main vehicle, is provided with map information, other sub vehicles can obtain the map information to recognize the position of the traffic intersection or the like, and thus the position of the intersection that each vehicle is approaching can be recognized by each vehicle.

(2) According to the second aspect of the present invention, since only the traffic intersections that the main vehicle should notice may be selectively extracted, information on the traffic intersections that are not necessary to be noticed are not issued, and thus communication effectiveness and efficiency is improved.

(3) According to the third aspect of the present invention, the sub vehicle that is not provided with map information is, nonetheless, still able to recognize the position of the traffic intersection that it is approaching, together with the positions of the main vehicle and itself.

(4) According to the fourth aspect of the present invention, when at least one vehicle is provided with map information, the sub vehicle that is not provided with the position survey means or map information can recognize the traffic intersection that it is approaching by itself.

(5) According to the fifth aspect of the present invention, a sub vehicle that is not provided with position survey means is, nonetheless, still able to recognize the current position of itself.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle recognition support system in which each of a plurality of vehicles recognizes a current position of itself, and exchanges said current position by wireless communication with others of the plurality of vehicles, wherein at least one of the plurality of vehicles is a main vehicle, the system comprising:
a navigation system on the main vehicle for providing map information including positional information of a traffic intersection; and
means on the main vehicle for transmitting said map information to a sub vehicle via said wireless communication, the sub vehicle lacking its own navigation system for providing said map information.

2. The vehicle recognition support system according to claim 1, said main vehicle further comprising:
means for extracting said positional information of the traffic intersection existing in a prescribed region in a direction of travel from said map information; and
means for providing said positional information of the traffic intersection to the sub vehicle by said wireless communication.

3. The vehicle recognition support system according to claim 1, wherein said main vehicle and said sub vehicle are each provided with position survey means including a differential global positioning system which receives said current position from a global positioning system antenna and corrects said current position with correction information received by an FM antenna, whereby said current position of the main vehicle and said current position of the sub vehicle are determined independently of each other.

4. A vehicle recognition support system according to claim 1, said sub vehicle comprising:
means for obtaining said positional information of the traffic intersection; and
means for displaying attention attracting symbols related to said current positions of said main vehicle and said sub vehicle along with said positional information of the traffic intersection.

5. The vehicle recognition support system according to claim 4, wherein means for displaying attention attracting symbols related to said current positions of said main vehicle and said sub vehicle includes a visual display and a voice transmitter.

6. The vehicle recognition support system according to claim 1, wherein said wireless communication between said main vehicle and said sub vehicle employs a Carrier Sense Multiple Access (CSMA) system.

7. The vehicle recognition support system according to claim 1, wherein the sub vehicle lacks a display screen for displaying said map information.

8. A vehicle recognition support system for a plurality of vehicles capable of wireless communication with each other wherein at least one of the plurality of vehicles is a main vehicle, said main vehicle comprising:

position survey means for determining a current position of said main vehicle;

map information including positional information of a traffic intersection;

means for extracting said positional information of the traffic intersection existing in a prescribed range in a direction of travel from said map information; and means for issuing said current position of said main vehicle and said positional information of the traffic intersection to a sub vehicle via said wireless communication, said sub vehicle lacking its own position survey means for determining said current position.

9. The vehicle recognition support system according to claim 8, said sub vehicle comprising:

means for obtaining said position of said main vehicle and said positional information of the traffic intersection by said wireless communication;

distance measurement means for measuring a relative distance to said main vehicle; and means for determining a current position of the sub vehicle based on the travel distance of the sub vehicle and time-based variations in said relative distance with respect to the main vehicle.

10. The vehicle recognition support system according to claim 8, wherein said position survey means on said main vehicle includes a differential global positioning system which enables said main vehicle to receive said current position of said main vehicle from a global positioning system antenna and to correct said current position with correction information received by an FM antenna, whereby a current position of said sub vehicle is determined by a control unit of said sub vehicle based on said current position of the main vehicle.

11. The vehicle recognition support system according to claim 8, wherein said main vehicle includes first display means for displaying said current position of said main vehicle and a current position said sub vehicle, said first display means including a visual display and a voice transmitter, and wherein said sub vehicle includes second display means for displaying attention attracting symbols related to said current positions of said main vehicle and said sub vehicle along with said positional information of the traffic intersection.

12. The vehicle recognition support system according to claim 8, wherein said wireless communication between said main vehicle and said sub vehicle employs a Carrier Sense Multiple Access (CSMA) system.

13. The vehicle recognition support system according to claim 8, wherein the sub vehicle lacks its own differential global positioning system.

14. The vehicle recognition support system according to claim 8, wherein the sub vehicle lacks a display screen for displaying said map information.

* * * * *